United States Patent [19]

Yeh et al.

[11] Patent Number: 5,742,708
[45] Date of Patent: Apr. 21, 1998

[54] METHOD AND SYSTEM FOR PERFORMING PERSPECTIVE PROJECTION CONVERSION

[75] Inventors: Thomas I. Yeh, Penfield; Francis K. Tse, Rochester; George W. Lahue, Canandaigua, all of N.Y.

[73] Assignee: Xerox Corporation, Stamford, Conn.

[21] Appl. No.: 558,311

[22] Filed: Nov. 15, 1995

[51] Int. Cl.[6] ............................................. G06K 9/32
[52] U.S. Cl. .................. 382/299; 382/298; 358/445; 358/447; 358/451; 358/455; 358/486
[58] Field of Search ............................ 382/298, 299; 358/445, 447, 451, 455, 486

[56] References Cited

U.S. PATENT DOCUMENTS

| | | | |
|---|---|---|---|
| 5,258,854 | 11/1993 | Eschbach | 358/445 |
| 5,301,037 | 4/1994 | Kanp et al. | 358/451 |
| 5,363,213 | 11/1994 | Coward et al. | 358/455 |
| 5,387,985 | 2/1995 | Loce et al. | 358/447 |
| 5,553,171 | 9/1996 | Lin et al. | 382/299 |
| 5,604,608 | 2/1997 | Walsh et al. | 358/486 |
| 5,608,821 | 3/1997 | Metcalfe et al. | 382/252 |

*Primary Examiner*—Leo Boudreau
*Assistant Examiner*—Daniel G. Mariam
*Attorney, Agent, or Firm*—Michael J. Nickerson

[57] ABSTRACT

A system and process prints a high resolution image on a high addressable image output terminal by converting an image at one resolution to an image having a lower resolution in a fast-scan direction and a higher resolution in a pixel depth direction. The converted image is then processed and binarized prior to being printed on a high addressable printer. The system or process utilizes a conversion circuit which includes a two-bit per pixel packing circuit, a scanline buffer circuit, a logic circuit, and a look-up table. The conversion circuit initially converts the image into an image having a lower resolution in the fast-scan direction and a higher pixel depth resolution. Thereafter, the image is further converted to an image having a lower resolution in the slow-scan direction and a higher pixel depth resolution. This conversion of a high resolution image to a lower resolution is carried without any substantial lost to the image content data.

8 Claims, 10 Drawing Sheets

METHOD AND SYSTEM FOR PERFORMING PERSPECTIVE PROJECTION CONVERSION

FIELD OF THE PRESENT INVENTION

The present invention is directed to resolution conversion of binary images. More specifically, the present invention is directed to resolution conversion of binary images while substantially preserving the information content of the original image.

BACKGROUND OF THE PRESENT INVENTION

Image information, be it color or black and white, is commonly generated in a bitmap format at a particular resolution K×L×b, corresponding to a desired printer output, where K is a number of spots per unit of length in one dimension, L is a number of spots per unit length in the other dimension, and b is the depth of each pixel, in number of levels. This bitmap is present for every color separation of the output device; i.e., 4 bitmaps for a 4-color output device, 3 bitmaps for a 3-color output device, 2 bitmaps for a 2-color output device and 1 bitmap for a black and white output device.

Typically, a black and white output device will render a bitmap of image data at 600 spots per inch (spi) in both dimensions, at a one bit pixel depth giving 2 levels. In contrast, the resolutions of the images being generated for today's printers are diverse and are usually greater than the native resolution of the printer as a result of PCs, scanners, decomposers, and image processing techniques becoming more robust and sensitive. This growth in diversity on the image generation side of the system has not been replicated by the printers. Thus, to properly print an image, the resolution of the image must be converted to that of the printer's resolution.

This presents a problem. It has been suggested to simply convert the image to the new resolution using scaling methods, but such a solution can cause loss of information content in the converted image, especially when the resolution of the image is greater than the printer's resolution. Therefore, it is desirable to provide a resolution conversion process which converts the image to the printer's resolution, but also retains the information content of the original image.

SUMMARY OF THE PRESENT INVENTION

One aspect of the present invention is a method for converting a high-resolution binary image to a grayscale low-resolution image. The method converts a first image having a first fast-scan resolution and a first pixel depth resolution to a second image having a second fast-scan resolution and a second pixel depth resolution. The second fast-scan resolution is lower than the first fast-scan resolution and the first pixel depth resolution is lower than the second pixel depth resolution.

A second aspect of the present invention is a method for converting a high-resolution image to a low-resolution image. This method converts a first image having high fast-scan and slow-scan resolutions to a second image having lower fast and slow-scan resolutions, while substantially preserving information content of the first image.

Another aspect of the present invention is a perspective projection resolution conversion circuit. The circuit includes a two-bit per pixel packing circuit, a scanline buffer circuit, a logic circuit, and a look-up table.

A fourth aspect of the present invention is a perspective projection resolution conversion circuit which includes packing means for packing a predetermined number of pixels of an original image into a two-bit per pixel, scanline buffer means for buffering said two-bit per pixels, logic means for generating an address from the buffered pixels, and memory means for storing grayscale pixel values.

Further objects and advantages of the present invention will become apparent from the following descriptions of the various features of the present invention.

BRIEF DESCRIPTION OF THE DRAWINGS

The following is a brief description of each drawing used in describing the present invention, thus, the drawings are being presented for illustrative purposes only and should not be limitative of the scope of the present invention, wherein.

DETAILED DESCRIPTION OF THE DRAWINGS

Figure 1:
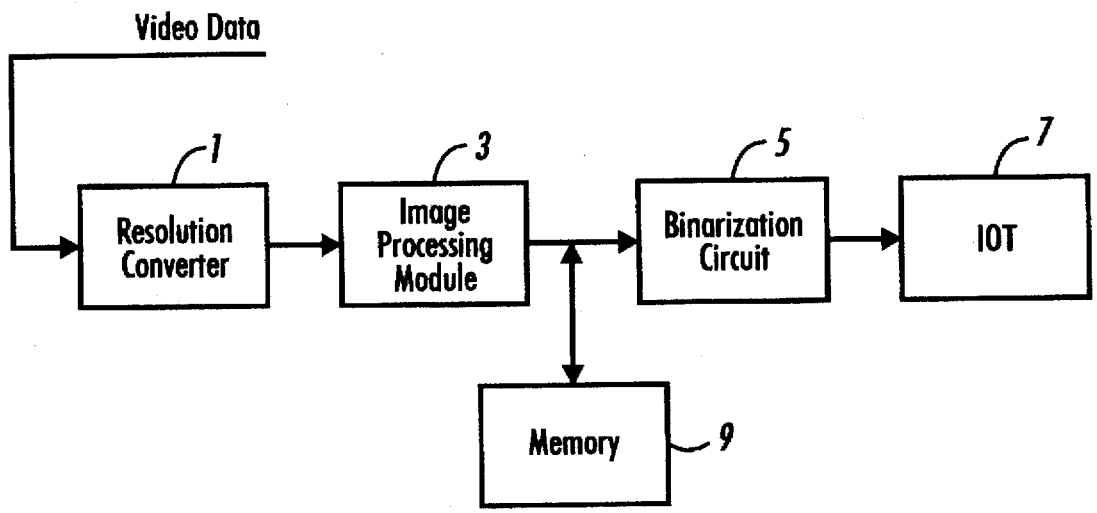
FIG. 1 is a block diagram illustrating a printing system according to the aspects of the present invention.

The following will be a detailed description of the drawings illustrating the present invention. In the description, as well as in the drawings, like reference numerals represent like devices, circuits, or equivalent circuits performing the same or equivalent functions.

In describing the present invention, the term "pixel" has been utilized. This term may refer to an electrical (or optical, if fiber optics are used) signal which represents the physical measurable optical properties at a physically definable area on a receiving medium. The receiving medium can be any tangible document, photoreceptor, or marking material transfer medium. Moreover, the term "pixel" may refer to an electrical (or optical, if fiber optics are used) signal which represents the physically measurable optical properties at a physically definable area on a display medium. A plurality of the physically definable areas for both situations represents the physically measurable optical properties of the entire physical image to be rendered by either a material marking device, electrical or magnetic marking device, or optical display device.

Lastly, the term "pixel" may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

Also, in describing the present invention, the terms "fast-scan resolution", "slow-scan resolution", and "pixel depth resolution" have been utilized. The term "fast-scan resolution" refers to the number of pixels or spots generated per inch (spi) in the fast-scan direction or electrical scan of the image. More specifically, fast-scan resolution refers to the resolution of the number of pixels making up a single scanline of an image. Moreover, the term "slow-scan resolution" refers to the number of pixels or spots per inch (spi) in the slow-scan direction; i.e., slow-scan resolution refers to the number of scanlines generated per inch.

The term "pixel depth resolution" refers to the number of bits (bpp) utilized to define the grayscale properties of a pixel or subpixel. For example, if a single bit is the pixel depth resolution for a particular pixel, this resolution would characterize the pixel as having two levels or as being either black or white. However, if the pixel depth resolution for a particular pixel is 2 bits, the resolution may allow the pixel to be defined as a matter of four separate gray levels from white to black.

Thus, in defining the present invention, the resolution of the pixel will be stated in numeric values separated by "Xs" wherein the first numeric value corresponds to the fast-scan resolution, the second numeric value corresponds to the slow-scan resolution, and the third numeric value corresponds to the pixel depth resolution.

FIG. 1 illustrates a block diagram of a printing system utilizing the concepts of the present invention. In this embodiment, video data or image data in the form of pixels is fed into a resolution converter or perspective projection resolution converter 1. This image data may be received directly from a scanner, PCs, network, decomposer, or other electronic image generating device. The perspective projection resolution converter 1 converts a high fast-scan and slow-scan resolution, low pixel depth resolution image into an image having a lower fast-scan and slow-scan resolution and a higher pixel depth resolution.

The converted image data or video data is then fed into an image processing module 3 which may carry out a variety of image processing functions such as tonal reproduction curve (TRC) adjustment, scaling, filtering, etc. The processed image or video data is fed either into a memory 9 to be stored for later use or directly into, in the preferred embodiment, a binarization circuit 5 which converts the high pixel depth resolution image data into binarized image data. This binarization circuit 5, in the preferred embodiment of the present invention, is a high addressable error diffusion circuit which will be described in more detail below. The binarized image data from the binarization circuit 5 is then fed into an image output terminal 7 such as a laser printer, thermal ink-jet printer or other type of marking engine which is capable of converting an electronic representation of an image to a tangible document or display of the image.

Figure 6:
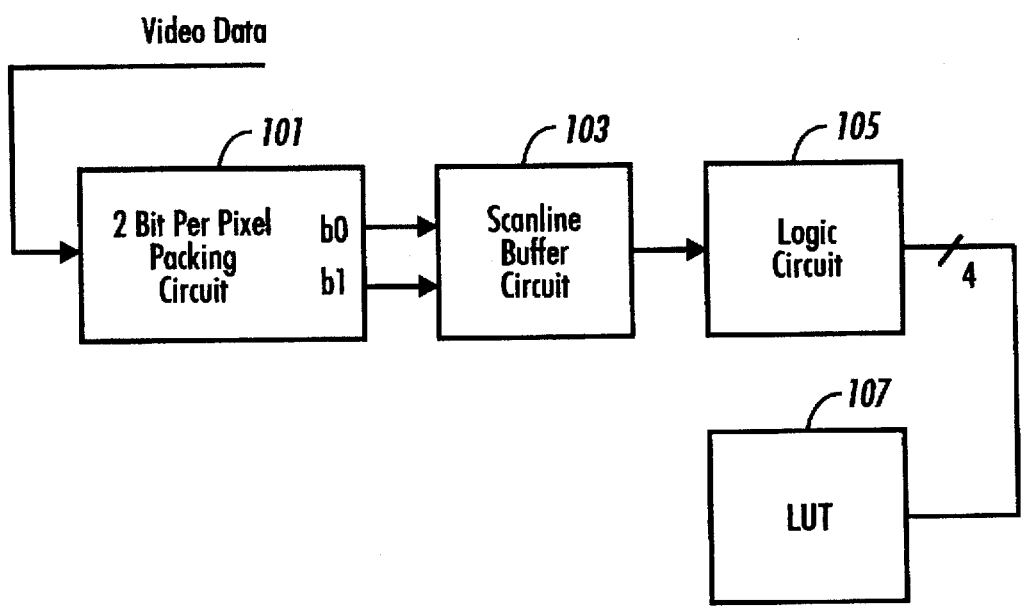
FIG. 6 is a block diagram illustrating a perspective projection conversion circuit according to the concepts of the present invention.

FIG. 6 illustrates a block diagram detailing the perspective projection resolution converter circuit 1 of FIG. 1. As illustrated in FIG. 6, the video or image data is fed into a 2-bit per pixel packing circuit 101 which converts a predetermined number of pixels from the high fast-scan and slow-scan resolution/low pixel depth resolution image or video data into a low fast-scan resolution, high slow-scan resolution, 2-bit pixel depth resolution pixel of image data. The fast-scan and pixel depth resolution converted image data is then fed into a scanline buffer circuit 103 which temporarily stores the pixels of image data so as to enable further resolution conversion in the slow-scan direction. The image data from the scanline buffer circuit 103 is then fed into a logic circuit 105 which generates an address that is used to index a look-up table 107 having stored therein a plurality of possible image data values for a particular pixel. The exact functions of each of these circuits will be described below in more detail with respect to FIGS. 2–5.

Figure 2:
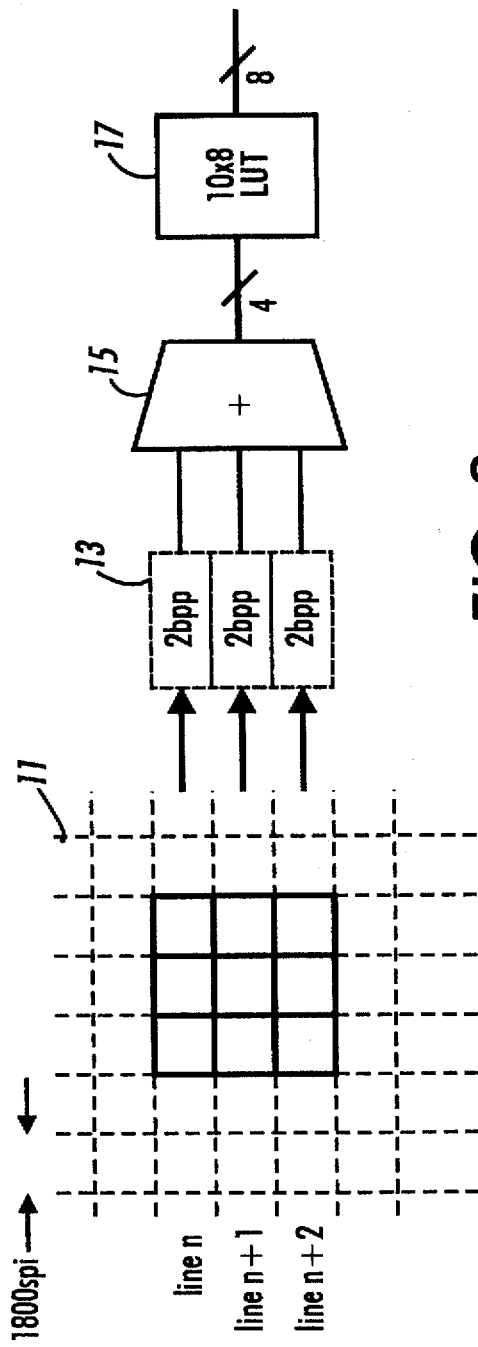
FIG. 2 is a block diagram illustrating the conversion of an 1800×1800×1 image to a 600×600×8 image according to the concepts of the present invention.

FIG. 2 illustrates the situation wherein the image or video data being received by the 2-bit per pixel packing circuit has a resolution of 1800×1800×1. In other words, the image or video data has a fast-scan resolution of 1800 spi, a slow-scan resolution of 1800 spi, and a pixel depth resolution of 1 bpp. The 2-bit per pixel packing circuit 101 encodes three 1800 spi resolution pixels into a pixel having a fast-scan resolution of 600 spi, a slow-scan resolution of 1800 spi, and a pixel depth resolution of 2 bpp. The 2-bit per packing circuit 101 carries out this encoding by counting the number of ON pixels represented in the three original 1800 spi pixels.

The generated 2 bpp 600 spi fast-scan resolution pixels are then stored in a scanline buffer circuit 13 until three scanlines of image context are available for further processing. Once three scanlines of context are available, a logic circuit 15, which includes an adder, takes three 2 bpp 600 spi fast-scan resolution pixels which are adjacent in the slow-scan direction from the scanline buffer 13 and sums the pixels values to generate a 4-bit value representing the number of ON pixels in a three pixel by three pixel matrix of the original 1800×1800×1 image data.

This 4-bit value is then utilized as an address to index a ten by eight look-up table 17 which converts the 4-bit value into a single 600×600×8 resolution gray pixel of image data. In other words, FIG. 2 illustrates the conversion of a three pixel by three pixel matrix of 1800×1800×1 pixels into a single 600×600×8 pixel wherein the gray value of this single pixel has ten possible values. In the preferred embodiment, the range of possible values are from 0 to 255.

Figure 3:
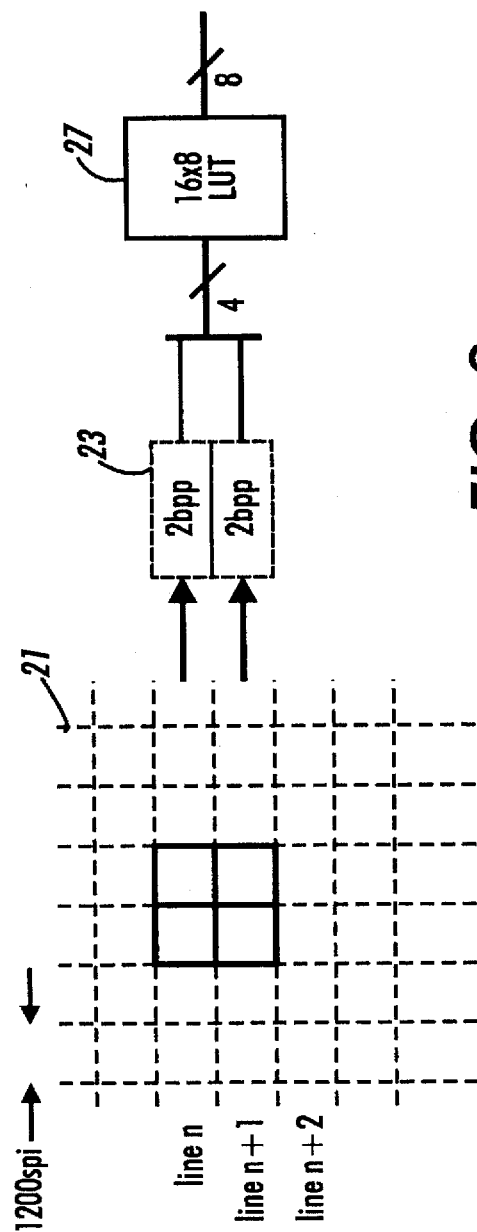
FIG. 3 is a block diagram illustrating the conversion of an 1200×1200×1 image to a 600×600×8 according to the concepts of the present invention.

FIG. 3 illustrates the scenario where the image data or video data fed to the 2-bit per pixel packing circuit 101 has a fast-scan resolution of 1200 spi, a slow-scan resolution of 1200 spi, and a pixel depth resolution of 1 bpp. As in the case of the 1800 spi resolution image data, the 1200 spi image data is encoded so as to convert two pixels of the 1200 spi image data into a pixel of image data having a fast-scan resolution of 600 spi, a slow-scan resolution of 1200 spi, and a pixel depth resolution of two bpp. This encoding is realized by grouping the two bits from the two 1200 spi pixels into a single pixel. In other words, unlike the 1800 spi scenario, the pixel value of the single encoded pixel does not represent the number of ON pixels in the two 1200 spi pixels.

The encoded pixels are then stored in a scanline buffer circuit 23 until two scanlines of context are available for processing. Once two scanlines of context are available, the logic circuit 105 takes the pixel values from two 2 bpp pixels which are adjacent in the slow-scan direction to generate a 4-bit address that is utilized to index a sixteen by eight look-up table 27 such that the sixteen by eight look-up table 27 generates a single pixel having a fast-scan resolution of 600 spi, a slow-scan resolution of 600 spi, and a pixel depth resolution of 8 bpp.

In other words, in this conversion process, each two pixel by two pixel matrix of 1200 spi pixels of image data is converted into a single pixel. Having a fast-scan resolution of 600 spi, a slow-scan resolution of 600 spi, and a pixel depth resolution of 8 bpp wherein the single pixel has sixteen possible gray values.

Figure 4:
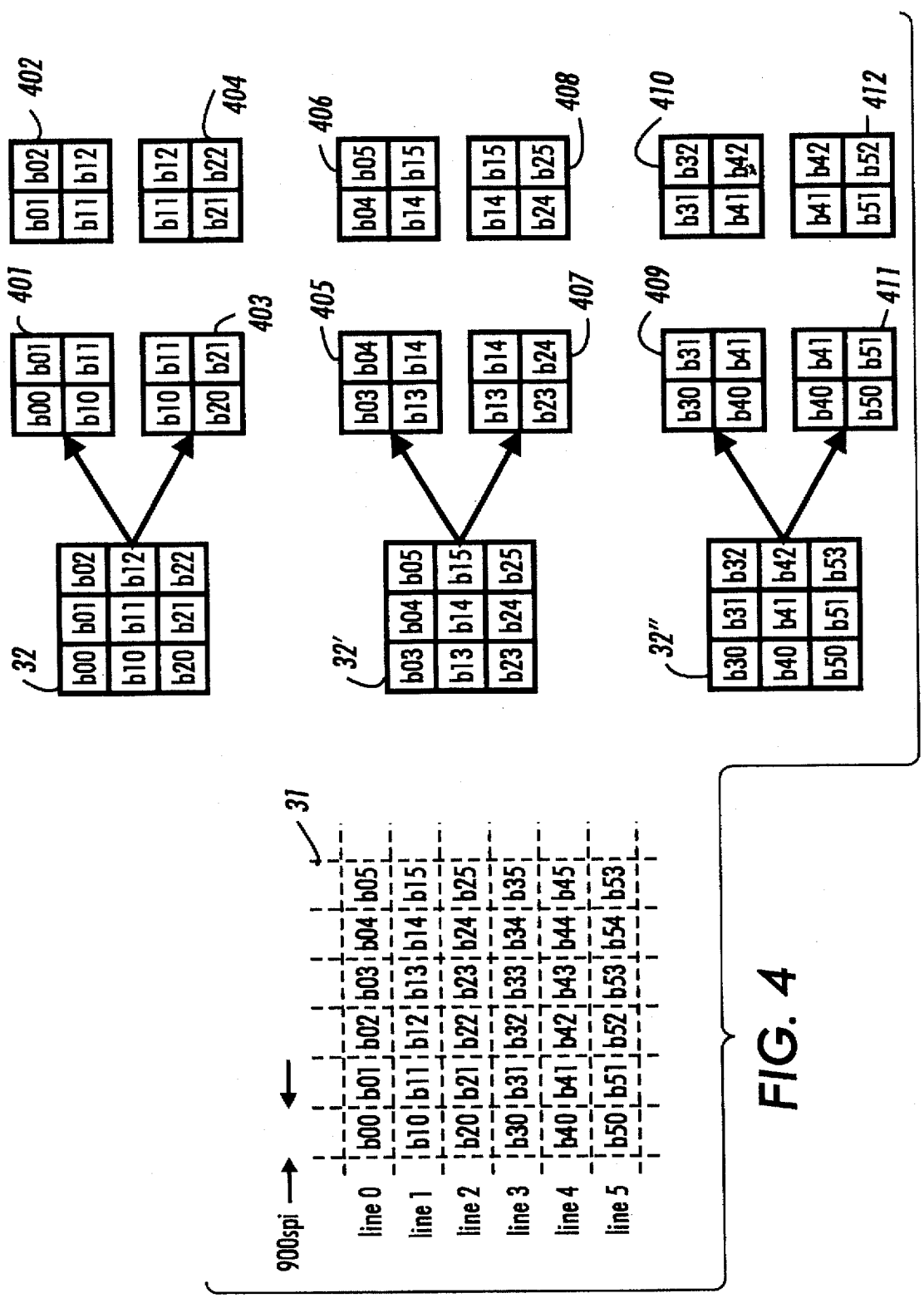
FIG. 4 is a graphical representation of a conversion of a 900×900×1 image to a 600×600×4 image according to the concepts of the present invention.
Figure 5:
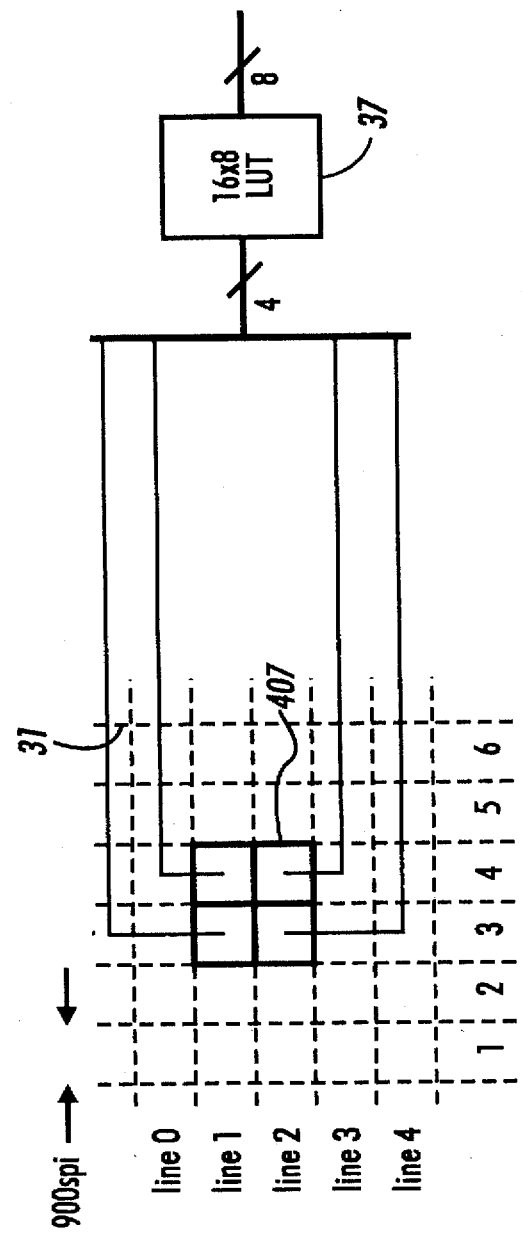
FIG. 5 is a graphical representation of the further conversion of the image in FIG. 4 to a 600×600×8 image according to the concepts of the present invention.

FIGS. 4 and 5 illustrate the perspective projection resolution conversion process for converting image or video data having a fast-scan and slow-scan resolution of 900 spi and a pixel depth resolution of 1 bpp. As illustrated in FIG. 4, the image data or video data 31 is broken up into three pixel by three pixel matrices (32, 32', and 32") wherein the pixel resolution is 900 spi in the fast-scan and slow-scan direction and a pixel depth resolution of 1 bpp. Thereafter, each three pixel by three pixel matrix is converted into overlapping two pixel by two pixel matrices (401 to 412) where each two pixel by two pixel matrix represents a single pixel having a fast-scan or slow-scan resolution of 600 spi.

To realize a pixel having a fast-scan or slow-scan resolution of 600 spi and a pixel depth resolution of 8 bpp, the 4 bits of a two pixel by two pixel matrix, as illustrated in FIG. 5, are converted into an address by logic circuit 105 which is used to index a sixteen by eight look-up table 37 such that the look-up table 37 generates the 8-bit pixel value for the single 600 spi pixel.

In other words, each three pixel by three pixel matrix of image data having a fast-scan or slow-scan resolution of 900 spi and a pixel depth resolution of 1 bpp is converted into four single pixels covering two separate scanlines wherein the four pixels have a fast-scan and slow-scan resolution of 600 spi and a pixel depth resolution of 8 bpp.

Figure 7:
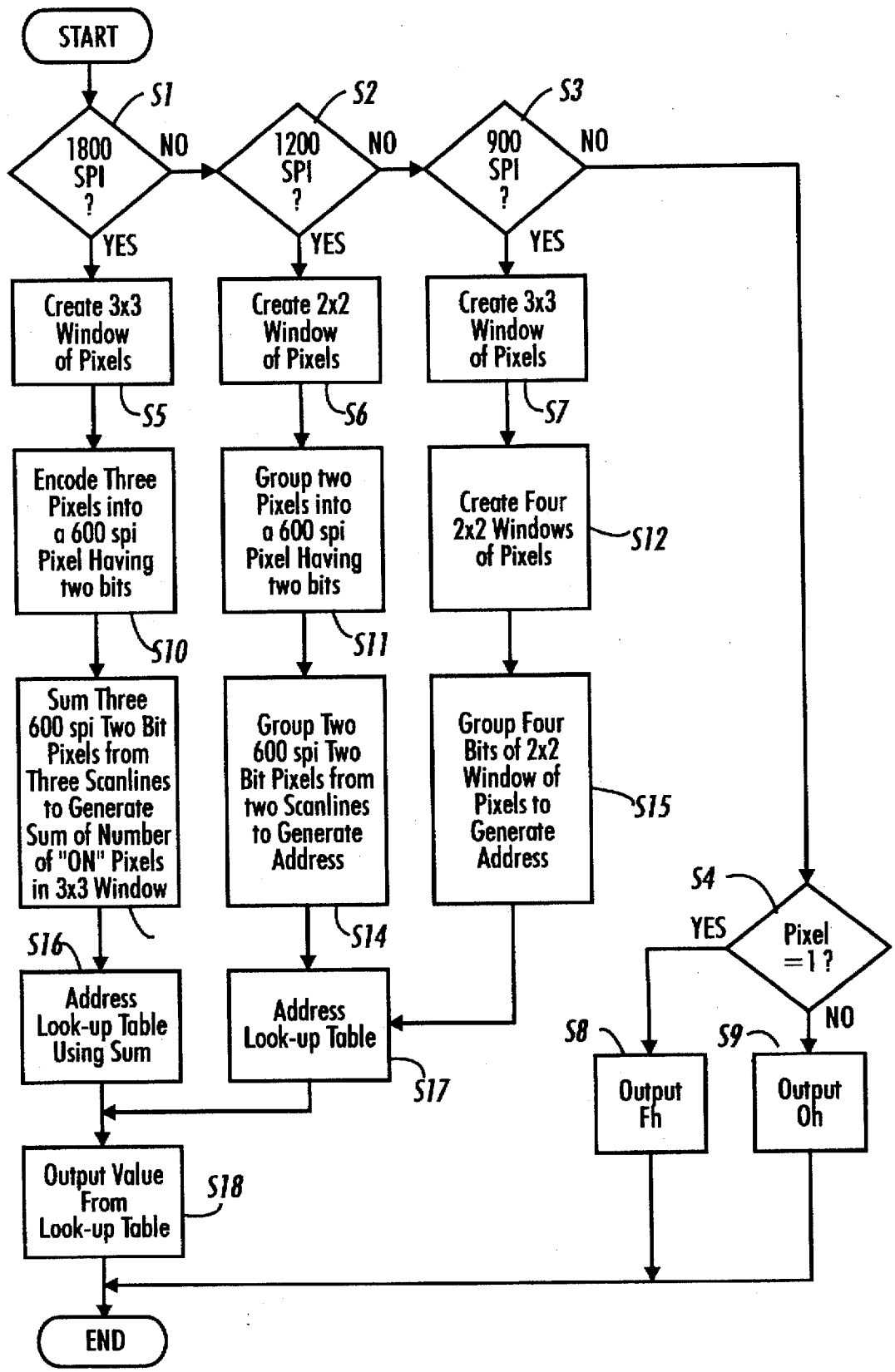
FIG. 7 is a flowchart illustrating the conversion process according to the concepts of the present invention.

FIG. 7 illustrates a method for carrying out the perspective projection resolution conversion process according to one embodiment of the present invention. As illustrated in FIG. 7, the process determines at step S1 whether the incoming image or video data has a resolution in the fast-scan or slow-scan direction corresponding to 1800 spi and a pixel depth resolution of 1 bpp. If the image or video data has this specified resolution, step S5 creates a three pixel by three pixel window of pixels having the 1800 spi resolution.

From this three pixel by three pixel window, step S10 encodes three pixels into a pixel having a fast-scan resolution of 600 spi, a slow-scan resolution of 1800 spi and a pixel depth resolution of 2 bpp. Thereafter, three of the pixels generated in step S10 from three adjacent scanlines are summed to generate a value which represents the number of ON pixels in the three pixel by three pixel window of pixels having the 1800 spi resolution. This value is then utilized as an address to index a look-up table at step S16 so as to output the corresponding value in the look-up table. This output value corresponds to the gray value of the pixel, pixel depth resolution of 8 bpp, for a pixel having a fast-scan and slow-scan resolution of 600 spi.

On the other hand, if step S1 determines that the image or the video data does not have 1800 spi resolution, step S2 determines whether the image or video data has a fast-scan or slow-scan resolution of 1200 spi. If the image or video data has a fast-scan or slow-scan resolution of 1200 spi, step S6 creates a two pixel by two pixel window of pixels having a resolution of 1200 spi. Thereafter, step S11 groups two of these pixels from the two pixel by two pixel window into a single pixel having a fast-scan resolution of 600 spi and a pixel depth resolution of 2 bpp. Step S14 then groups two of the pixels generated in step S11 from two adjacent scanlines to generate a 4-bit address which is utilized to index a look-up table at step S17. As noted before, the look-up table outputs a value representing the gray value of the pixel having a fast-scan or slow-scan resolution of 600 spots per inch. The new pixel also has a pixel depth resolution of 8 bpp.

If step S2 determines that the image data or video data does not have a resolution of 1200 spi, step S3 determines whether the image data or video data has a fast-scan or slow-scan resolution of 900 spi. If the image data or video data has a fast-scan or slow-scan resolution of 900 spi, step S7 creates a three pixel by three pixel window of pixels having the 900 spi resolution. From this three pixel by three pixel window, step S12 creates four overlapping two pixel by two pixel windows. Thereafter, step S15 groups the 4 bits of the two pixel by two pixel window to generate an address which is utilized to index a look-up table at step S17. Step S18 then outputs a value representing the gray value of the pixel having a resolution of 600 spi in the fast-scan and slow-scan direction and a pixel depth resolution of 8 bpp from the look-up table according to the address supplied by step S15.

As noted above, the present invention can be utilized with a high addressable error diffusion process. Although the preferred high addressable error diffusion process has been described in a co-pending U.S. patent application, Ser. No. 08/285,326; a brief description will be given below. The entire contents of this co-pending U.S. patent application, Ser. No. 08/285,326, are hereby incorporated by reference.

Figure 8:
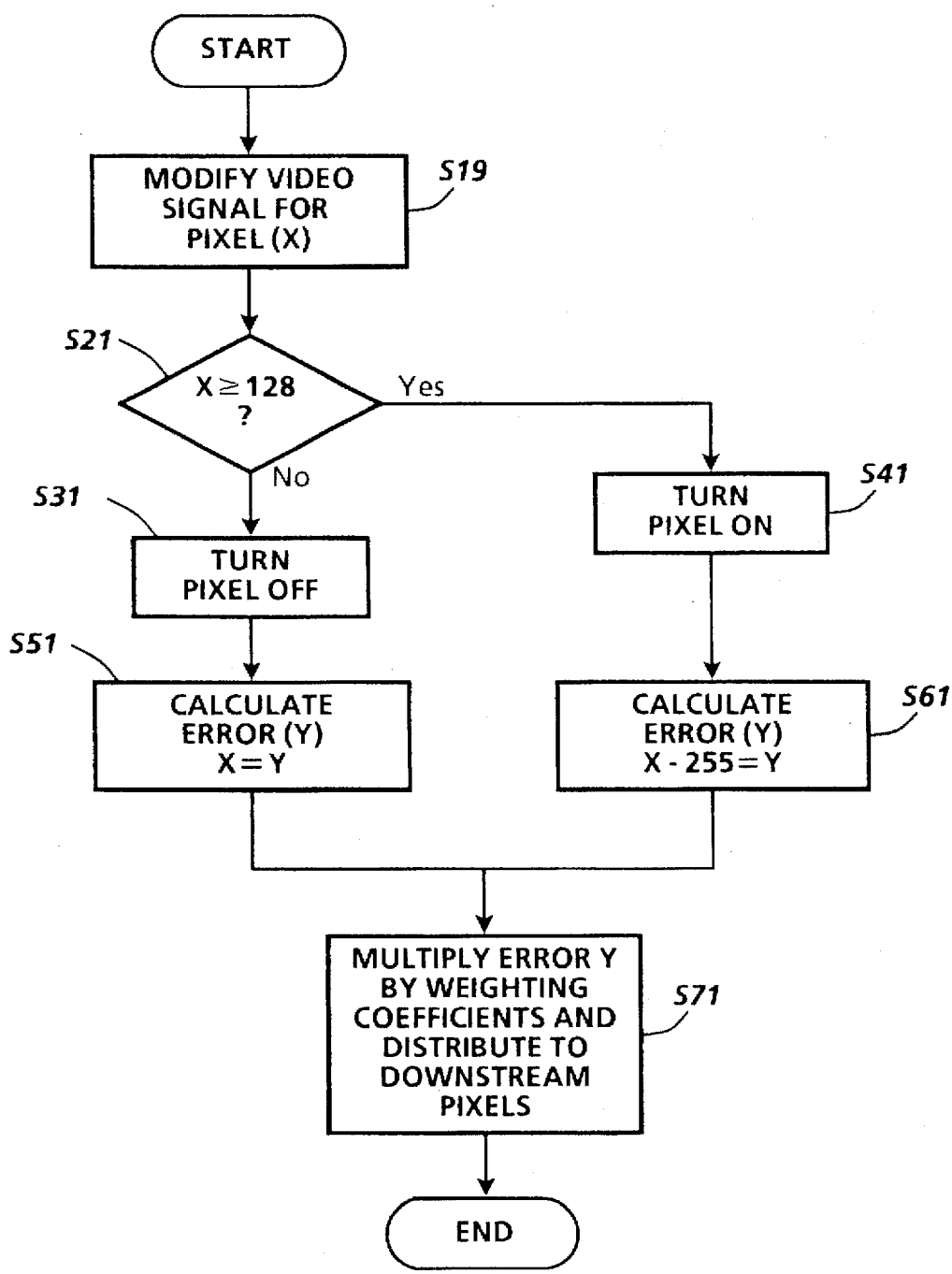
FIG. 8 shows a flowchart illustrating a typical error diffusion method.

FIG. 8 illustrates a typical error diffusion technique. The flowchart is self-explanatory and thus a full description thereof will not be given.

Figure 9:
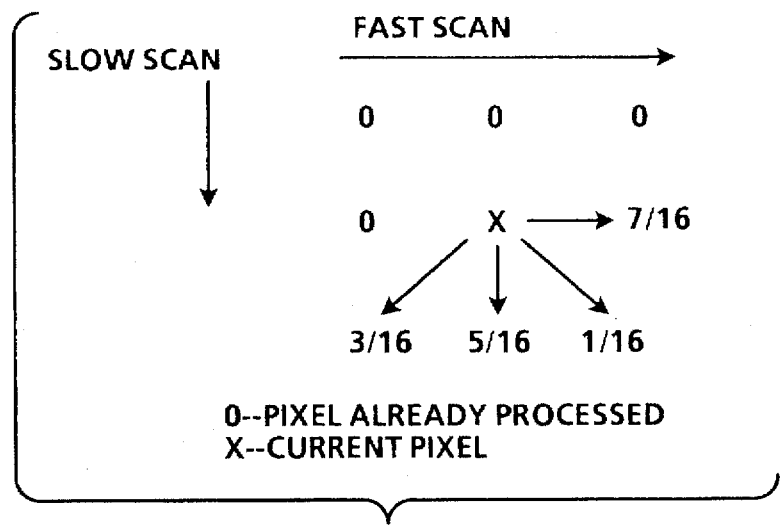
FIG. 9 shows a diagram illustrating a typical weighting coefficient scheme.

In FIG. 9, the character "X" represents the current pixel being thresholded. The weighted error from this threshold process is diffused to adjacent downstream pixels according to preselected coefficients.

In describing the error diffusion process, it is assumed that the video value is in a range between 0 and 255. However, any chosen range for the video signal can be utilized in conjunction with the present invention. In conventional error diffusion methods, the printing of the pixels is determined by comparing a modified input with a threshold. The modified input video signal is the input video signal, V, plus an accumulated error term, $e_i$, determined from the processing of previous pixels. If the modified input video signal of the pixel is greater than or equal to the threshold, the output is a logical one and an error term of $V+e_i-255$ is propagated to the downstream pixels. If the modified input video signal is less than the threshold, the logical output is 0 and an error of $V+e_i$ is propagated downstream.

To extend the conventional error diffusion process to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality.

In explaining the high addressability error diffusion process, it is assumed that the input gray levels at pixel location i and pixel location i+1 are represented by $V_i$ and $V_{i+1}$, respectively. The pixel values are assumed to be 8 bit integers wherein, for the sake of explanation, 0 denotes white and 255 denotes black. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below. With respect to one interpolation scheme, the steps for determining the printing or rendering of a subpixel are as follows.

Figure 10:
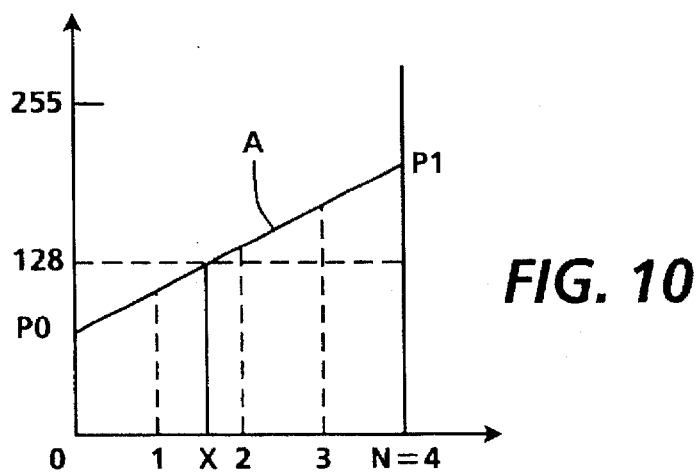
FIG. 10 shows a graph illustrating a subpixel interpolation for one embodiment of the present invention.

Initially, the modified pixel values $P0_i=V_{i-1}+e_{i-1}=P1_{i-1}$ and $P1_i=V_i+e_i$ are computed at two locations corresponding to the input resolution. In this example, as illustrated in FIG. 10, the subpixels are denoted by 0 to N-1. In FIG. 10, the high addressability characteristic, N, is equal to 4.

As illustrated in FIG. 10, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized.) The intersection of the line connecting P0 and P1 and the line representing the threshold at 128 determines which subpixels are to be rendered or printed. The X coordinate of the point of intersection is determined and normalized to N by the equation X=N (128-P0)/(P1-P0).

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 10, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

Figure 11:
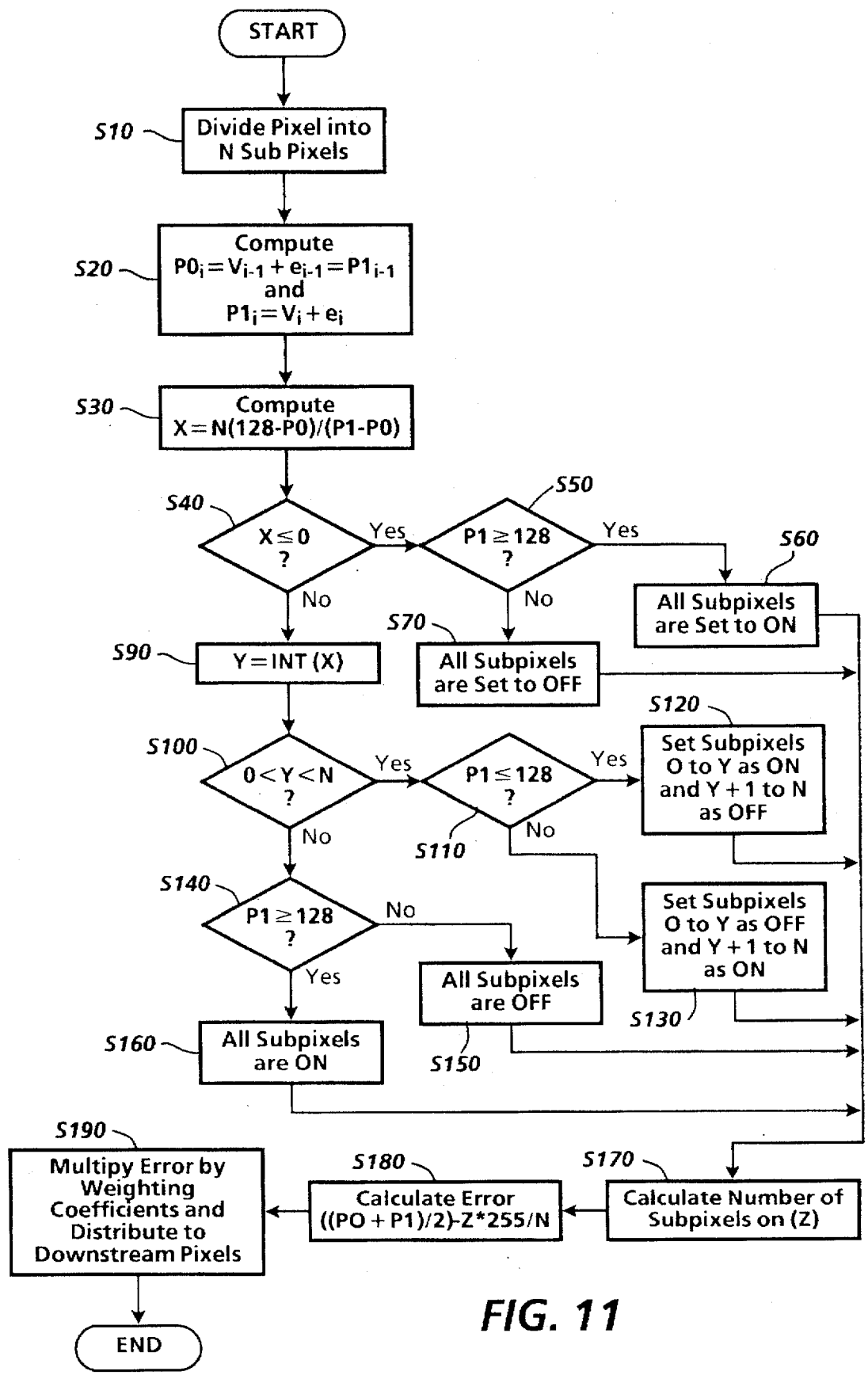
FIG. 11 shows a flowchart illustrating the error diffusion method utilizing the interpolation schemes of FIG. 10.

FIG. 11 illustrates the actual method utilized to carry out the interpolation and error distribution process described above. In FIG. 11, at Step S10, the modified video input signal is divided into N subpixel values. At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S110 determines whether the value P1 is less than or equal to 128. If the value P1 is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

Another interpolation method with respect to implementing a high addressability error diffusion method will be describe as follows.

Figure 12:
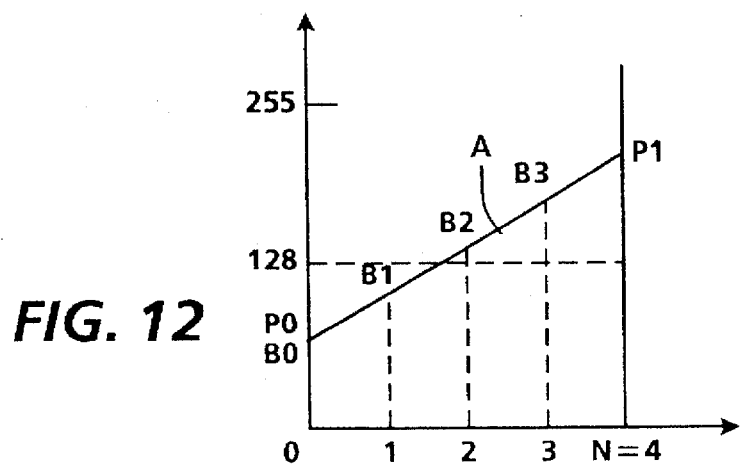
FIG. 12 shows a graph illustrating subpixel interpolation for a second embodiment of the present invention.

Initially, the modified pixel values $P0_i=V_i+e_i$ and $P1_i=V_{i+1}+e_i$ are computed. FIG. 12 illustrates the values P0 and P1 for the second version of the high addressability error diffusion method of the present invention. As in the first method, the subpixels are denoted by 0 to N-1 wherein, as in the previous case, the high addressability characteristic is N=4.

The interpolated subpixel values are computed as $B_n=P0+n(P1-P0)/N$ for n=0 to N-1. The interpolated subpixel values are then compared with a threshold value which in a preferred embodiment is 128, assuming that the video value ranges from 0 to 255.

If $B_n$ is greater than or equal to 128, the subpixel is turned ON; otherwise, the subpixel is turned OFF. In the second version, the error to be propagated to downstream pixels is computed as the desired output, (P0+P1)/2, minus the actual output, namely, y*255/N wherein y is the number of subpixels turned ON. The error is then multiplied by a set of weighting coefficients and distributed to the downstream pixels as in the first version.

Figure 13:
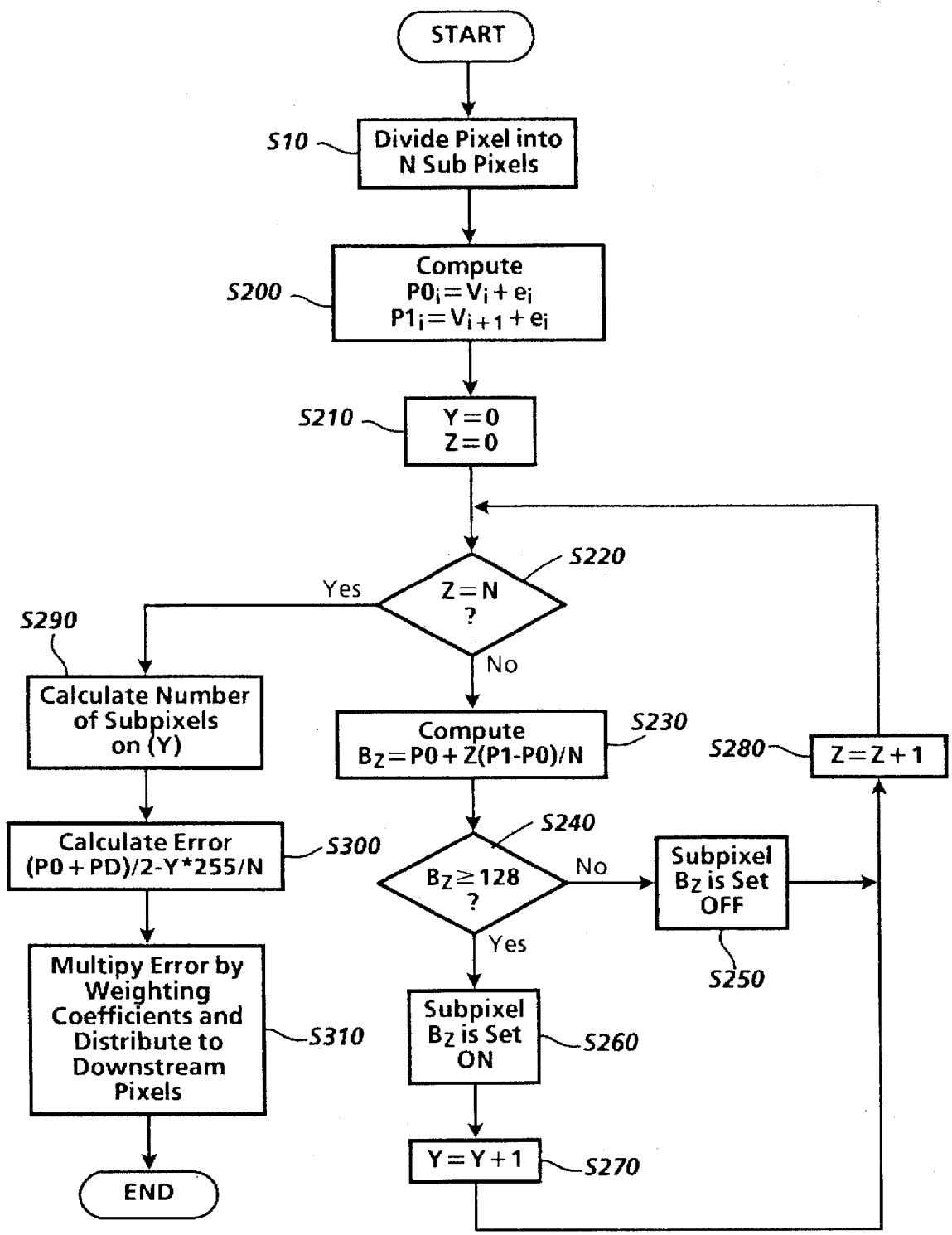
FIG. 13 shows a flowchart illustrating the error diffusion method of the present invention utilizing the interpolation scheme of FIG. 12.

FIG. 13 illustrates the process utilized in the second interpolation version of the high addressability error diffusion method of the present invention. As in the FIG. 11, the inputted modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

Figure 14:
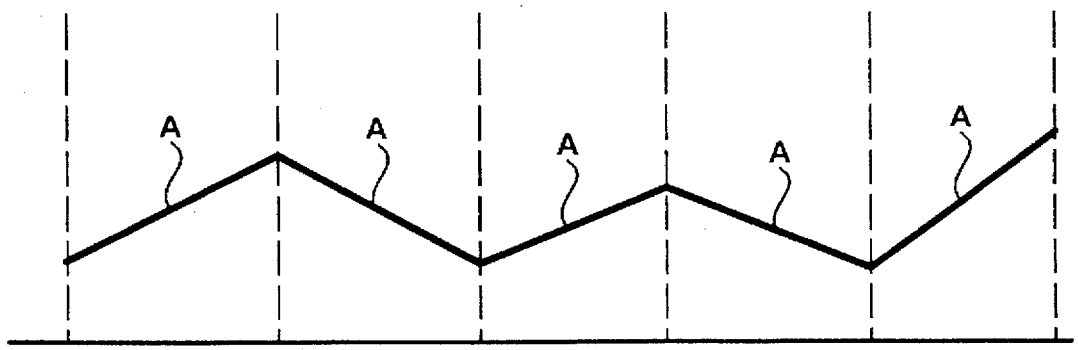
FIGS. 14 and 15 show graphs illustrating the subpixel relationship for the interpolation schemes of FIGS. 10 and 12.

FIG. 14 illustrates the high addressability relationship between adjacent pixels utilizing the first interpolation version of high addressability error diffusion method. More specifically, it is noted that the P1 value of the present pixel is utilized as the P0 value for the next pixel.

Figure 15:
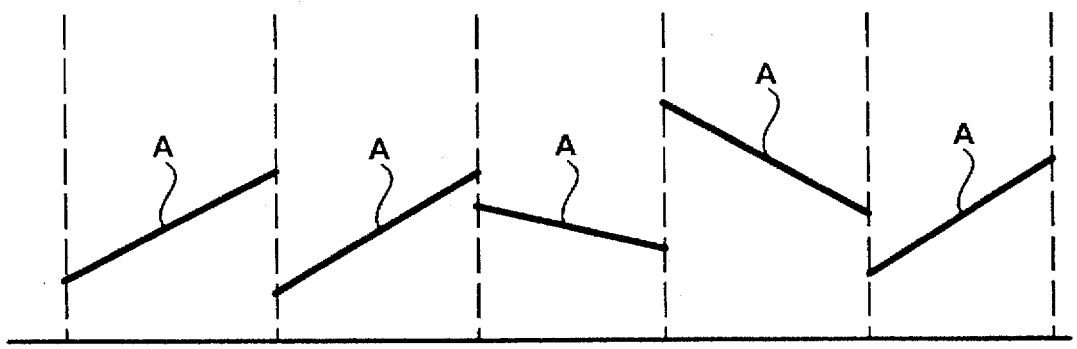

On the other hand, FIG. 15 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the high addressability error diffusion methods will be different.

Although the present invention has been described in detail above, various modifications can be implemented without departing from the spirit of the present invention. For example, the preferred embodiment of the present invention has been described with respect to a printing system; however, this resolution conversion method is readily implemented in a display system. Moreover, the conversion process of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the gray level of the pixel being processed. Furthermore, the present invention is readily applicable to any rendering system, not necessarily a binary output device. It is contemplated that the concepts of the present invention are readily applicable to a four-level output terminal or higher.

Also, the present invention has been described with respect to initial resolutions of 900×900×1, 1200×1200×1, or 1800×1800×1 and a final resolution of 600×600×8.

However, it is contemplated by the present invention to take any high fast-scan/slow-scan and low pixel depth resolution image and scale it to a lower fast-scan/slow-scan resolution having a higher pixel depth resolution. Moreover, the present invention contemplates the scaling of any high fast-scan/slow-scan and low pixel depth resolution image to a lower fast-scan/slow-scan resolution having a higher pixel depth resolution and processing that scaled image with a high addressability error diffusion process.

Lastly, the present invention has been described with respect to a monochrome or black/white environment. However, the concepts of the present invention are readily applicable to a color environment. Namely, the perspective projection resolution conversion process of the present invention can be applied to each color space value representing the color pixel.

While the invention has been described with reference to various embodiments disclosed above, it is not confined to the details set forth above, but is intended to cover such modifications or changes as may come within the scope of the attached claims.

What is claimed is:

1. A method for converting a high resolution binary image to a gray scale low resolution image, comprising the steps of:

(a) receiving a first image having a first fast-scan resolution and a first pixel depth resolution; and (b) converting the first image having a first fast-scan resolution and a first pixel depth resolution to a second image having a second fast-scan resolution and a second pixel depth resolution, the second fast-scan resolution being lower than the first fast-scan resolution and the first pixel depth resolution being lower than the second pixel depth resolution;

said step (b) including the substeps of, (b1) counting a number of ON pixels in a predetermined number of adjacent fast-scan pixels of the first image, (b2) generating a pixel having a pixel depth resolution of two and a value corresponding to the number of ON pixels counted in said substep (b1), (b3) summing a predetermined number of pixels generated in said substep (b2) which are adjacent in a slow-scan direction, and (b4) using the sum to index a look-up table which contains grayscale pixel values.

2. A method for converting a high resolution binary image to a gray scale low resolution image, comprising the step of:

(a) receiving a first image having a first fast-scan resolution and a first pixel depth resolution; and (b) converting the first image having a first fast-scan resolution and a first pixel depth resolution to a second image having a second fast-scan resolution and a second pixel depth resolution, the second fast-scan resolution being lower than the first fast-scan resolution and the trust pixel depth resolution being lower than the second pixel depth resolution;

said step (b) including the substeps of, (1) generating a pixel having a pixel depth resolution of two from a predetermined number of adjacent fast-scan pixels of the first image, (b2) summing a predetermined number of pixels generated in said substep (b1) which are adjacent in a slow-scan direction, and (b3) using the sum to index a look-up table which contains grayscale pixel values.

3. A method for converting a high resolution binary image to a gray scale low resolution image, comprising the step of:

(a) receiving a first image having a first fast-scan resolution and a first pixel depth resolution; and (b) converting the first image having a first fast-scan resolution and a fast pixel depth resolution to a second image having a second fast-scan resolution and a second pixel depth resolution, the second fast-scan resolution being lower than the first fast-scan resolution and the fast pixel depth resolution being lower than the second pixel depth resolution;

said step (b) including the substeps of, (b1) generating a pixel having a pixel depth resolution of two from a predetermined number of adjacent fast-scan pixels of the first image, and (b2) using values of a predetermined number of the generated pixels adjacent in both a fast-scan and slow-scan direction to index a look-up table which contains pixel values corresponding to a fast-scan resolution being lower than the fast-scan resolution of the first image and a pixel depth resolution being higher than the pixel depth resolution of the first image.

4. The method as claimed in claim 2, wherein the predetermined number of adjacent fast-scan pixels is three and the predetermined number of generated pixels in three.

5. The method as claimed in claim 2 wherein the predetermined number of adjacent fast-scan pixels is two and the predetermined number of generated pixels is two.

6. The method as claimed in claim 2, wherein said substep (a1) generates two pixels having a pixel depth resolution of two from three fast-scan pixels of the first image and said substep (a2) produces two sums by summing two out of three generated pixels which are adjacent in a slow-scan direction.

7. The method as claimed in claim 3 wherein the predetermined number of adjacent fast-scan pixels is two and the predetermined number of generated pixels is two.

8. The method as claimed in claim 3, wherein said substep (a1) generates two pixels having a pixel depth resolution of two from three fast-scan pixels of the first image and said substep (a2) uses values of two out of three generated pixels which are adjacent in a slow-scan direction to index the look-up table.

* * * * *